Aug. 4, 1953
C. O. CHRISTENSEN
2,647,277
WHEEL AND MOUNTING ASSEMBLY
Filed Jan. 3, 1949
2 Sheets-Sheet 1
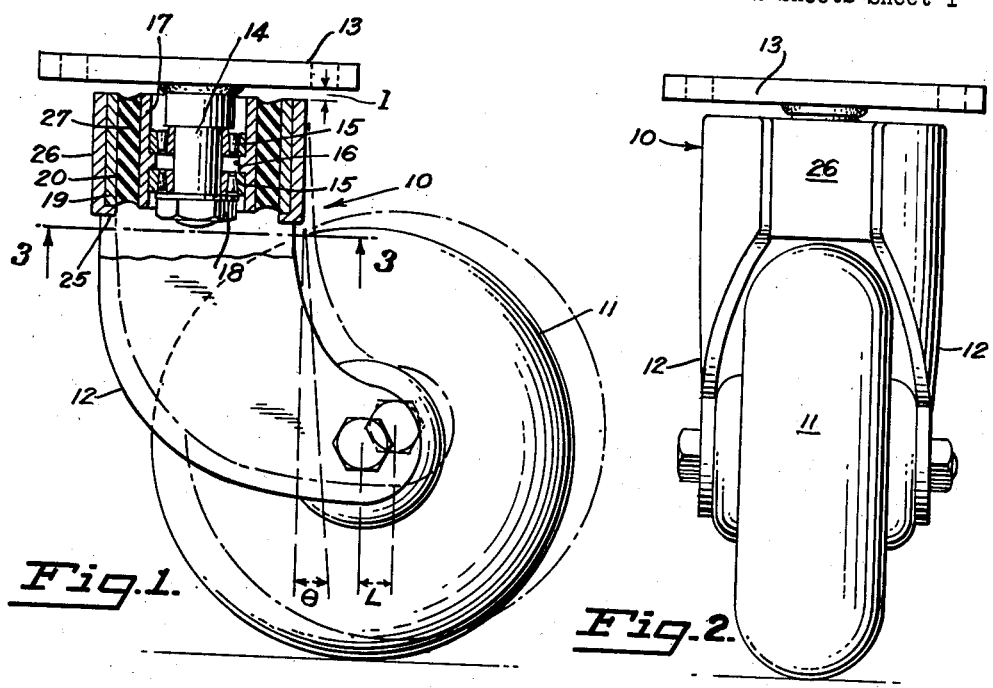
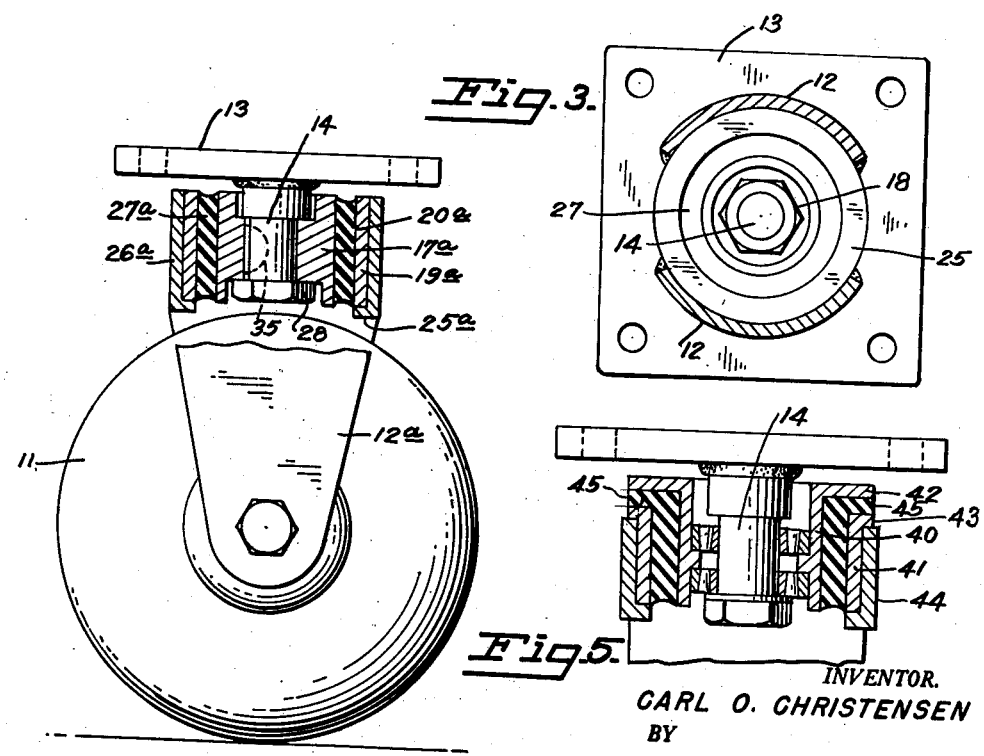
INVENTOR.
CARL O. CHRISTENSEN
BY
Mellin and Hanscom
ATTORNEYS Aug. 4, 1953 C. O. CHRISTENSEN 2,647,277
WHEEL AND MOUNTING ASSEMBLY
Filed Jan. 3, 1949 2 Sheets-Sheet 2

INVENTOR.
CARL O. CHRISTENSEN
BY
Mellin and Hanscom
ATTORNEYS

Patented Aug. 4, 1953

2,647,277

UNITED STATES PATENT OFFICE 2,647,277

WHEEL AND MOUNTING ASSEMBLY

Carl O. Christensen, Walnut Creek, Calif., assignor to Roll-Rite Corporation, Oakland, Calif., a corporation of California Application January 3, 1949, Serial No. 68,849

4 Claims. (Cl. 16—44)

This invention relates to a wheel and mounting assembly.

In the design of casters and other wheeled devices for use with trucks carrying large loads, such as hand trucks, lift trucks and trucks used on airports to carry luggage and the like, simplicity of construction is, of course, a desideratum. Also, a sturdy structure is desirable which is capable of sustaining hard blows and generally rough treatment without disalignment of the king pin or damage to or breakage of other parts.

It is an object o the present invention to provide an improved form of wheel and mounting assembly.

It is a further object of the invention to provide a wheel and mounting assembly or the like of sturdy, simple construction which is capable of sustaining heavy loads and rough treatment, including sharp blows, without disalignment of the parts or breakage.

These and other objects of the invention will be apparent from the ensuing description and the appended claims.

Certain forms which the invention may assume are exemplified in the following description and illustrated by way of example in the accompanying drawings, in which:

Fig. 1 is a view, partly in side elevation and partly in section, of a wheel and mounting assembly, embodying the design features of the invention.

Fig. 2 is an end elevation of the same.

Fig. 3 is a transverse section taken along the line 3—3 of Fig. 1.

Fig. 4 is a view similar to that of Fig. 1 but of a different type of wheel, of non-swiveling, non-caster type.

Fig. 5 is a fragmentary view, similar to that of Fig. 1, showing a modified form of the invention.

Figure 6:
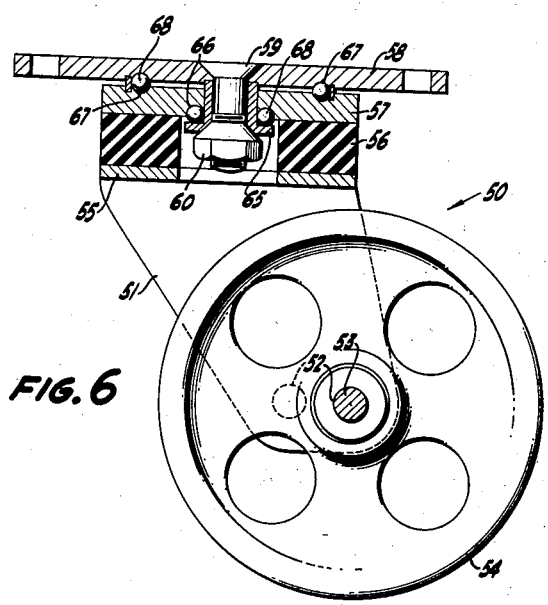
Fig. 6 is a view, partly in side elevation and partly in section, of still another and preferred form of caster wheel.

Referring now to the drawings, and more particularly Figs. 1, 2, and 3, there is shown a wheel and mounting assembly generally designated as 10 comprising the usual rubber-tired wheel 11 and forks 12. Also shown are the usual base plate 13, king pin 14 and roller bearings 15. It will be seen that the roller bearings 15, which are of conical shape and of well known design, are spaced apart by a flange 16 formed on a collar 17, and that the bearings are held in place against axial displacement by a nut 18. In the usual construction of a caster wheel of this type, the collar 17 is rigidly secured to or is integral with the forks 12. However, in accordance with my present invention the collar 17 constitutes an inner collar which is spaced from an outer concentric collar 19, thus providing an annular space 20 for a purpose explained hereinafter. The outer collar 19 is supported upon and is revoluble upon a flange 25 formed on a sleeve 26, such sleeve being welded to the upper ends of the forks 12 or, if desired, being integral therewith. An annular layer of rubber 27 is disposed within the annular space 20, being firmly secured to the inner collar 17 and the outer collar 19 by any suitable means, preferably by vulcanization. The rubber used may be natural rubber or a synthetic rubber, and preferably it is neoprene rubber.

Referring now to Fig. 4 there is shown an ordinary non-caster, non-swiveling type of wheel comprising a rubber-tired wheel 11, base plate 13 and king pin 14 as in the caster wheel of Fig. 1. The king pin 14 is keyed by means of a key 35 to an inner collar 17a which is spaced from an outer collar 19a to provide an annular space 20a. The outer collar 19a is supported upon and is revoluble upon a flange 25a formed on a sleeve 26a which is rigidly secured to or is integral with the forks 12 of the wheel. A nut 28 threaded onto the lower end of the king pin 14 serves to hold the assembly together.

Referring now to Fig. 5, there is shown a modified form of caster wheel embodying my invention, and in which an inner collar 40 and an outer collar 41 are provided, which are similar to the inner collar 17 and outer collar 19, respectively, of Fig. 1. However, in this modification the inner collar is provided with an annular flange 42, and the outer collar 41 with an annular flange 43 which rests upon and is revoluble upon a sleeve 44. This construction is better adapted to hold the rubber annulus 45 firmly in place.

Referring again to Fig. 1, as indicated, the collars 17 and 19 and the sleeve 26 are spaced a substantial distance "*l*" below the bottom surface of the base plate 13, and the forks 12 are offset in the usual manner so as to allow castering of the wheel. When the wheel strikes an object causing impact thereagainst, the force is absorbed by the rubber annulus 27. For example, if the wheel 11 sustains a blow causing an angular displacement of the forks 12 through an angle θ, as indicated, the sleeve 26 and the outer collar 19 will be angularly displaced to a similar degree. Such displacement is limited only by the distance "*l*" and, as will be seen, the linear displacement L of the caster wheel is very much larger than the distance "*T*".

It will thus be apparent that a shock absorbing means is provided which is operable to absorb a blow delivered in any direction against the wheel 11. Such means is operable to sustain a very severe blow resulting in a relatively great displacement of the wheel 11. Yet at all times the king pin 14 is maintained in true alignment, being subjected to relatively little stress unless of course an unusually severe blow is encountered in excess of the designed performance of the structure.

Referring to Fig. 4, it will be apparent that the rubber annulus 27a of the wheel there illustrated will function in a similar manner. The wheel of Fig. 4 is not, of course, a caster wheel. Nevertheless, when it sustains a blow (which, in wheels of the usual design, would be transmitted to the king pin 14), the force thereof will be absorbed by the rubber annulus 27a. It will also be apparent that the structure of Fig. 5 will function similarly.

Figure 7:
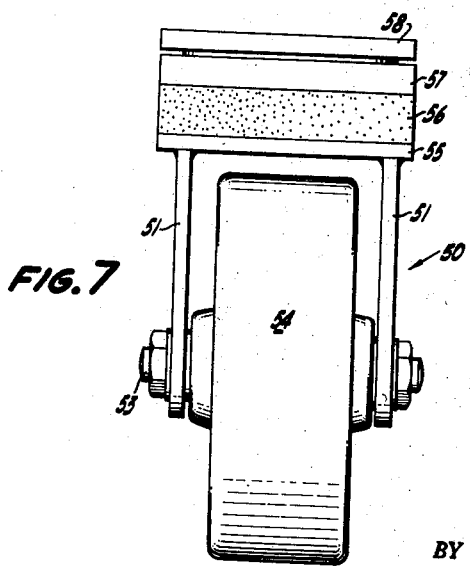
Fig. 7 is an end elevational view of the same.

Referring now to Figs. 6 and 7, there is shown a caster wheel generally designated as 50. This structure comprises forks 51 having spaced holes 52 formed therein for receiving the axle 53 of a flat face wheel 54. The forks 51 are integral with a lower plate 55 to which is vulcanized a layer of neoprene rubber 56. An upper plate 57 is similarly bonded to the rubber layer 56. A base plate 58 is provided, being rotatably mounted on the upper plate 57 by means of a king pin 59, a nut 60 and a flanged collar 65. As illustrated, a bearing race 66 is formed in the upper plate 57, and races 67 in the upper plate 57 and base plate 58, and ball bearings 68 seated in the bearing races provide a rotatable mounting for the caster wheel.

This form of caster wheel is especially advantageous for use with a flat face wheel, as illustrated. Such wheels are used to support very heavy loads and have metal tires. Such wheels do not follow an uneven floor properly, and they tend to pound a floor, thus causing damage to the wheel, the vehicle, the load and/or the floor. With the structure of Figs. 6 and 7, however, the resilient layer of rubber gives in all directions, thus absorbing a blow delivered in any direction. The wheel follows the contour of a floor accurately and evenly. An additional advantage is provided by the spaced holes 52. If greater strength is desired, it is bolted in the inner holes 52.

The rubber used in the various caster wheels described hereinabove is preferably neoprene rubber because of its oil resistance, and it is bonded to the adjacent metal members by any suitable means, preferably however by vulcanization.

It is thus apparent that a wheel structure, applicable to caster wheels and non-caster wheels, has been provided which is simple of design, easily fabricated, and easily assembled and disassembled. Metal to metal contact is completely eliminated. Among other advantages of this simplified structure are the fact that, with a caster wheel, as the load pressure increases, the offset of the wheel also increases, thus allowing the wheel to follow an uneven floor more freely. Misalignment of the king pins and bearings will not occur unless, of course, unusually severe shocks are encountered. Thus, high speed operation is possible as on an airport where trucks of heavily loaded vehicles are pulled at high speed over rough ground. The wheel and lower portions of the fork are full floating, thus absorbing up and down shock as well as side blows. The structure allows horizontal movement of the wheel under load so that the load is over an obstruction and the wheel follows the tension of the rubber, thus eliminating jars and jolts to the truck and operator. Also, the structure described permits the use of flat, metal tired wheels on concrete floors without undue likelihood of damage to the concrete. As stated, when a heavily loaded truck having metal tired wheels of the usual construction is used on a concrete floor, the wheels pound the floor, causing damage thereto. But with wheels of the construction described above, much less pounding occurs. Also the wheels of the invention can sustain blows from any direction, and at all times the wheels follow the floor.

While I have shown certain preferred forms of my invention, it is to be understood that various changes may be made in its construction by those skilled in the art without departing from the spirit of the invention as defined in the appended claims.

Having thus described my invention, what I claim and desire to secure by Letters Patent is:

1. A structure comprising a wheel, an arm rotatably mounting said wheel at its lower end, spaced inner and outer collars disposed concentrically and with their common axis perpendicular to the rotary axis of said wheel, each said collar having an outwardly extending annular flange at its upper end, said outer collar being supported by said arm at its upper end, means supporting said inner collar and adapted to mount said structure upon a vehicle body and a resilient material disposed in the annular space between said collars and flanges and bonded to said inner and outer collars.

2. In combination, a wheel and a mounting means therefor, said mounting means comprising spaced, parallel upper and lower plates, means rotatably mounted on said upper plate for mounting said mounting means on a vehicle body, said rotatably mounted means being mounted for rotation about a vertical axis, forks depending from the lower plate and being fixedly secured at their upper ends to the lower plate, said wheel being rotatably supported by and at the lower ends of the forks for rotation about a horizontal axis displaced laterally from said vertical axis, and a single annular resilient member disposed between said plates and bonded to said plates to provide the only connection therebetween.

3. In combination, a wheel and a mounting means therefor, said mounting means comprising a spaced pair of rigid annular members, means rotatably mounted on one of said members for mounting said mounting means on a vehicle body, said rotatably mounted means being mounted for rotation about a vertical axis, forks depending from the other rigid member and being fixedly secured at their upper ends to said other rigid member, said wheel being rotatably supported by and at the lower ends of the forks for rotation about a horizontal axis displaced laterally from said vertical axis, and a single annular resilient member disposed between and bonded to said rigid annular members to provide the only connection therebetween.

4. In combination, a wheel and a mounting means therefor, said mounting means comprising spaced inner and outer generally cylindrical rigid members, means rotatably mounted on the inner member for mounting said mounting means on a vehicle body, said rotatably mounting means being mounted for rotation about a vertical axis, a rigid wheel support depending from the outer member, said wheel being rotatably supported by and at the lower end of said wheel support for rotation about a horizontal axis displaced laterally from said vertical axis, and a resilient material disposed between said members and being bonded to said members to provide the only connection therebetween.

CARL O. CHRISTENSEN.

References Cited in the file of this patent

UNITED STATES PATENTS

| Number | Name | Date |
|---|---|---|
| 1,230,836 | Ballenberg | June 26, 1917 |
| 1,490,132 | Sheehy | Apr. 15, 1924 |
| 1,507,756 | Roe | Sept. 9, 1924 |
| 1,724,892 | Asher | Aug. 20, 1929 |
| 2,052,589 | Weiland | Sept. 1, 1936 |
| 2,111,561 | Herold | Mar. 22, 1938 |
| 2,189,708 | Coyne | Feb. 6, 1940 |
| 2,215,182 | Latshaw | Sept. 17, 1940 |
| 2,272,270 | Krotz | Feb. 10, 1942 |
| 2,442,831 | Scuttles | June 8, 1948 |
| 2,502,929 | Clark | Apr. 4, 1950 |